Figure 1:
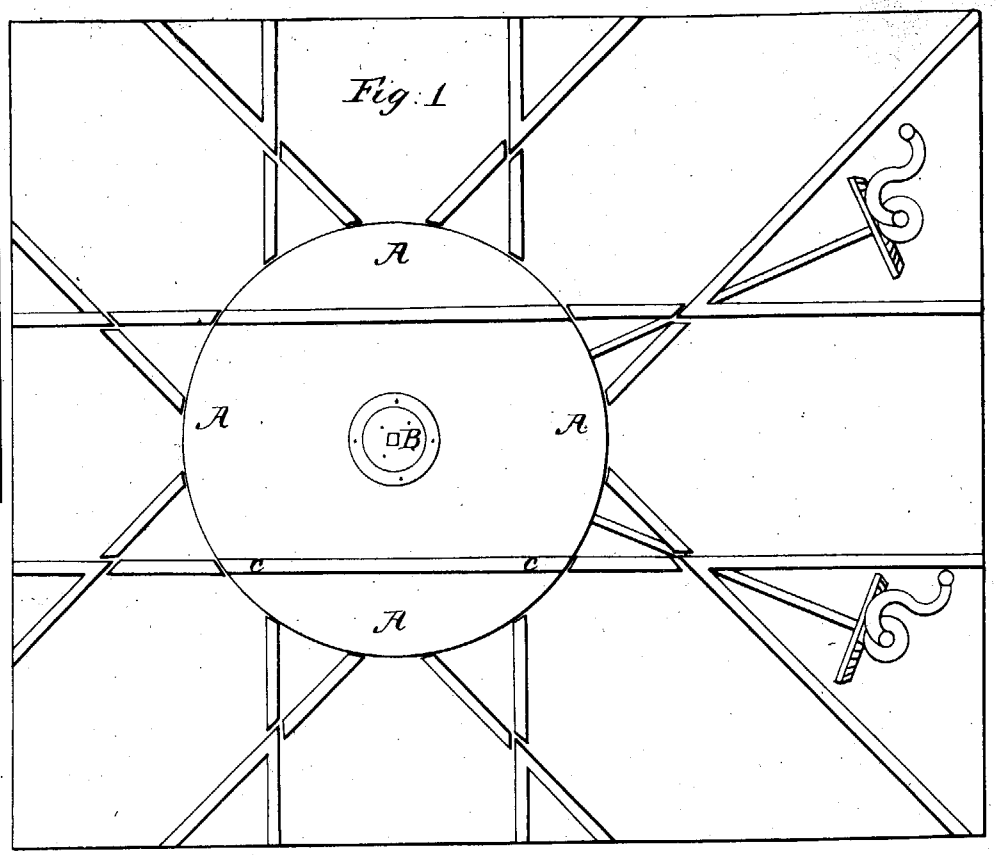
Figure 3:
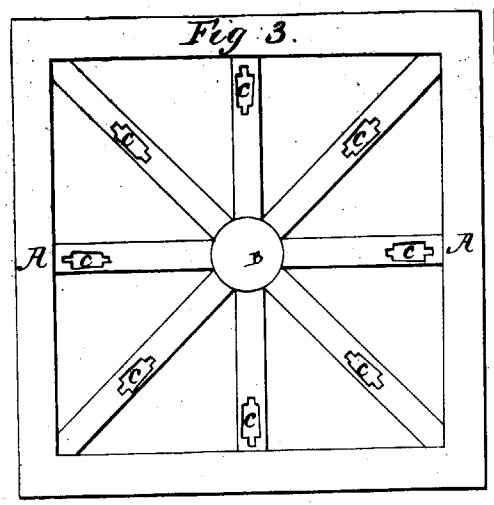
Figure 2:
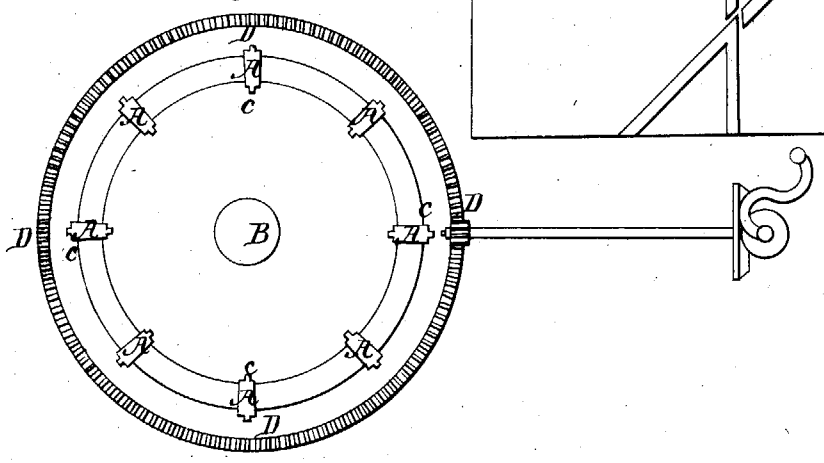

6060X

J. P. Fairlamb.

Railroad Turn-Table.

Patented Jul. 7, 1830.

THE GRAPHIC CO. PHOTO-LITH. 39 & 41 PARK PLACE, N.Y.

X6060 July 7 1830

Jonas P. Fairlamb
Letters Patent.

The Schedule referred to in these Letters Patent and making part of the same containing a description in the words of the said J. P. Fairlamb himself of his improvement in Moving Planes and Sections of Railways to be used in Cross and Branch Railways & Common Roads crossing the same Specification of a new and useful improvement in constructing cross Railways for the passage of Railway Carriages thereon, in any cross direction, also for changing the direction at any place of Railways the invention of the subscriber.

I provide a circular plane moveable at pleasure upon its centre, resting upon Rollers, and moved by a pivot wheel geared into face or other cogs placed in said horizontal circular plane: upon which plane I construct Railways corresponding and uniting as moved around with the Railways in any given direction. The manner of using this plane is manifest. When a carriage is about to cross either way nothing more is necessary than to place the Railway on said plane to unite with the Rail Road in the required direction. If it is required to change the direction of the carriage not crossing the Rail Road the carriage must be received on said platform and then all move round together to the given direction Witnesses
Wm. Groves
Fredk. Leonard J. P. Fairlamb County of Newcastle }
State of Delaware } ss. On this Eighth day of February in the year of our Lord One thousand Eight Hundred and twenty [illegible]. Personally appeared the aforenamed Jonas P

360. X6060

Fairlamb and made solemn affirmation according to Law that he verily believes himself to be the true and original inventor or discoverer of the improvement and construction above specified and described for cross Rail ways, or for changing the direction of any place of Rail ways and that he is a citizen of the United States.

Fred.k Leonard J.P.

Ex 1845 (215)